United States Patent
Bacallao et al.

(10) Patent No.: US 10,589,767 B2
(45) Date of Patent: Mar. 17, 2020

(54) CARTS FOR MOBILE CHECKOUT OF LAWN AND GARDEN PURCHASES

(71) Applicant: Walmart Apollo, LLC, Bentonville, AR (US)

(72) Inventors: Yurgis Mauro Bacallao, Centerton, AR (US); Michael D. Bookman, Suwanee, GA (US); Omar Cerda, Centerton, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 16/170,352

(22) Filed: Oct. 25, 2018

(65) Prior Publication Data

US 2019/0168792 A1 Jun. 6, 2019

Related U.S. Application Data

(60) Provisional application No. 62/593,472, filed on Dec. 1, 2017.

(51) Int. Cl.
| | |
|---|---|
| *B62B 1/26* | (2006.01) |
| *B62B 1/00* | (2006.01) |
| *B62B 1/20* | (2006.01) |
| *B62B 5/00* | (2006.01) |
| *G06Q 20/20* | (2012.01) |
| *B62B 5/04* | (2006.01) |
| *G07G 1/00* | (2006.01) |

(52) U.S. Cl.
CPC .............. *B62B 1/266* (2013.01); *B62B 1/008* (2013.01); *B62B 1/208* (2013.01); *B62B 5/00* (2013.01); *B62B 5/04* (2013.01); *G06Q 20/20* (2013.01); *G07G 1/0081* (2013.01); *B62B 2205/10* (2013.01); *B62B 2205/32* (2013.01)

(58) Field of Classification Search
CPC .. B62B 1/00; B62B 1/008; B62B 1/10; B62B 5/00; B62B 2205/32
See application file for complete search history.

(56) References Cited

U.S. PATENT DOCUMENTS

| | | | | |
|---|---|---|---|---|
| 2,835,503 | A * | 5/1958 | Humphries | B62B 1/26 280/47.19 |
| RE25,616 | E * | 7/1964 | Stanley | B62B 3/148 186/63 |
| 6,619,546 | B1 * | 9/2003 | Nguyen | A47F 9/047 235/383 |

(Continued)

FOREIGN PATENT DOCUMENTS

| | | |
|---|---|---|
| CN | 203720952 U | 7/2014 |
| CN | 105539534 A | 5/2016 |
| WO | 2016055815 A1 | 4/2016 |

*Primary Examiner* — Brian L Swenson
(74) *Attorney, Agent, or Firm* — Schmeiser, Olsen & Watts LLP; Timothy P. Collins (57) ABSTRACT

A cart for use by a store associate in a lawn and garden center comprises a frame; a folding tray table extending from a top region of the frame; at least one basket extending from the frame, wherein a combination of the tray table and the at least one basket are configured for receiving lawn and garden items and items used by the store associate to assist customers; at least one bagging fixture for holding shopping bags; and a wheel assembly coupled to a bottom region of the frame, comprising at least two wheels.

19 Claims, 6 Drawing Sheets

(56) References Cited

U.S. PATENT DOCUMENTS

| | | | |
|---|---|---|---|
| 7,547,037 B2 | 6/2009 | Poppinga et al. | |
| 7,679,522 B2 | 3/2010 | Carpenter | |
| 7,703,776 B1 * | 4/2010 | Nugent | B62B 1/22 |
| | | | 280/47.18 |
| 8,567,809 B2 * | 10/2013 | White | B62B 5/067 |
| | | | 280/35 |
| 9,090,276 B1 * | 7/2015 | Ihrke | B62B 3/027 |
| 9,120,657 B1 * | 9/2015 | Turner | B62B 1/10 |
| 9,440,668 B1 | 9/2016 | Chen et al. | |
| D799,139 S * | 10/2017 | Lee | D34/27 |
| 2005/0275195 A1 | 12/2005 | Matula et al. | |
| 2007/0120337 A1 * | 5/2007 | Gibbs | A01B 1/00 |
| | | | 280/79.3 |
| 2008/0000924 A1 | 1/2008 | Brady et al. | |
| 2008/0224433 A1 * | 9/2008 | Setzer | B62B 1/10 |
| | | | 280/47.131 |
| 2015/0344052 A1 * | 12/2015 | McClanahan | B62B 3/02 |
| | | | 280/35 |
| 2016/0107671 A1 * | 4/2016 | Wyse | B60T 7/12 |
| | | | 280/47.24 |
| 2018/0057033 A1 * | 3/2018 | Green | B62B 3/1412 |

\* cited by examiner

CARTS FOR MOBILE CHECKOUT OF LAWN AND GARDEN PURCHASES

RELATED APPLICATIONS

This application claims the benefit of U.S. Provisional Patent Application No. 62/593,472 filed on Dec. 1, 2017 entitled "Carts for Mobile Checkout of Lawn and Garden Purchases," the content of which is incorporated herein by reference in its entirety.

FIELD OF THE DISCLOSURE

The present disclosure relates generally to mobile checkouts, and more specifically to a cart used by store personnel for performing a mobile checkout operation with respect to lawn and garden item purchases at the retail establishment.

BACKGROUND

When shopping for lawn and garden items of interest, modern shoppers may use a mobile device to checkout and/or send a payment for the items. In some situations, some people may not be able to find a product they wish to purchase. In other situations, stores may find it helpful to know which items people would be willing to purchase or wished to be stocked and/or offered for sale at the store at a location. Accordingly, stores would prefer to have the flexibility to scan items and/or perform other point-of-sale (POS) operations at a traditional checkout counter, or at a different location inside or near the store. For example, stores having a lawn and garden center would enjoy the mobility of a POS operation, where a store employee can assist shoppers with their purchases, which may include transporting large, heavy, and/or cumbersome lawn and garden accessories, plants, mulch, and so on to shopper's vehicle, but to also conduct the POS operation on such items at the customer's vehicle in lieu of the checkout counter.

SUMMARY

In one aspect, provided is a cart for use by a store associate in a lawn and garden center, comprising: a frame; a folding tray table extending from a top region of the frame; at least one basket extending from the frame, wherein a combination of the tray table and the at least one basket are configured for receiving lawn and garden items and items used by the store associate to assist customers; at least one bagging fixture for holding shopping bags; and a wheel assembly coupled to a bottom region of the frame.

In some embodiments, the cart further comprises a brake system for locking or unlocking the wheels of the wheel assembly.

In some embodiments, the wheels have a same or similar configuration as shopping cart wheels, and removable for replacement with new shopping cart wheels.

In some embodiments, the frame includes a vertical portion extending from the top region to the bottom region for supporting the tray table, the at least one basket, and the at least one bagging fixture, and further includes a base portion at the bottom region to which the wheel assembly is coupled.

In some embodiments, the cart further comprises a trunk liner holder coupled to the vertical portion for holding a set of trunk liner bags.

In some embodiments, the cart further comprises a trunk liner holder coupled to the vertical portion for holding a set of trunk liner bags.

In some embodiments, the cart further comprises a platform coupled to the base for transporting lawn and garden items.

In some embodiments, the cart further comprises at least one stop element on which a front portion of the base which separates the base from a ground surface, wherein the at least one stop element is separated from the ground surface when a force applied to the top region of the frame causes the cart to pivot about the wheels.

In some embodiments, the at least one basket includes a first basket constructed and arranged for holding electronic devices for use by the store associate in a mobile point-of-sale operation, and a second basket constructed and arranged for holding a plurality of accessories for use by the store associate in assisting a store customer at the lawn and garden center.

In some embodiments, the folding tray table is folded into an up position when not in use, and extends to a down position when in use.

In some embodiments, the cart further comprises a power system including a battery, a generator that receives and processes power produced by a rotation of the wheels, at an electrical outlet for charging electronic items.

In some embodiments, the cart further comprises an audio speaker and a wireless network interface for generating and outputting audio from the cart.

In another aspect, provided is a cart for use by a store associate in a lawn and garden center, comprising: a frame comprising a vertical portion and a base at a distal end of the vertical portion; a handle extending from a proximal end of the vertical portion, the base extending in a first direction and the handle extending in a second direction that is opposite or nearly opposite than the first direction of the base; a folding tray table extending from the frame under the handle; a basket extending from the frame over the base wherein a combination of the tray table and the basket are constructed and arranged to receive and temporarily store lawn and garden items and items used by the store associate to assist customers; a wheel assembly coupled to the base; and a platform on which lawn and garden items are positioned for transport when a force is applied to the handle so that the wheel assembly includes a pivot point thereby raising the base off the ground so that wheels of the wheel assembly freely rotate. The cart further comprises at least one point-of-sale device coupled to the cart for providing a mobile point of sale operation from a location co-located with a delivery of the lawn and garden items.

In some embodiments, the cart further comprises a brake system for locking or unlocking the wheels of the wheel assembly.

In some embodiments, the wheels have a same or similar configuration as shopping cart wheels, and removable for replacement with new shopping cart wheels.

In some embodiments, the cart further comprises a trunk liner holder coupled to the vertical portion for holding a set of trunk liner bags.

In some embodiments, the cart further comprises at least one stop element on which a front portion of the base which separates the base from a ground surface, wherein the at least one stop element is separated from the ground surface when a force applied to the top region of the frame causes the cart to pivot about the wheels.

In some embodiments, the folding tray table is folded into an up position when not in use, and extends to a down position when in use.

In some embodiments, the cart includes a power system including a battery, a generator that receives and processes power produced by a rotation of the wheels, at an electrical outlet for charging electronic items.

In some embodiments, the cart further comprises an audio speaker and a wireless network interface for generating and outputting audio from the cart.

BRIEF DESCRIPTION OF THE DRAWINGS

Exemplary embodiments will now be described, by way of example only, with reference to the following drawings, in which.

DETAILED DESCRIPTION

Figure 1:
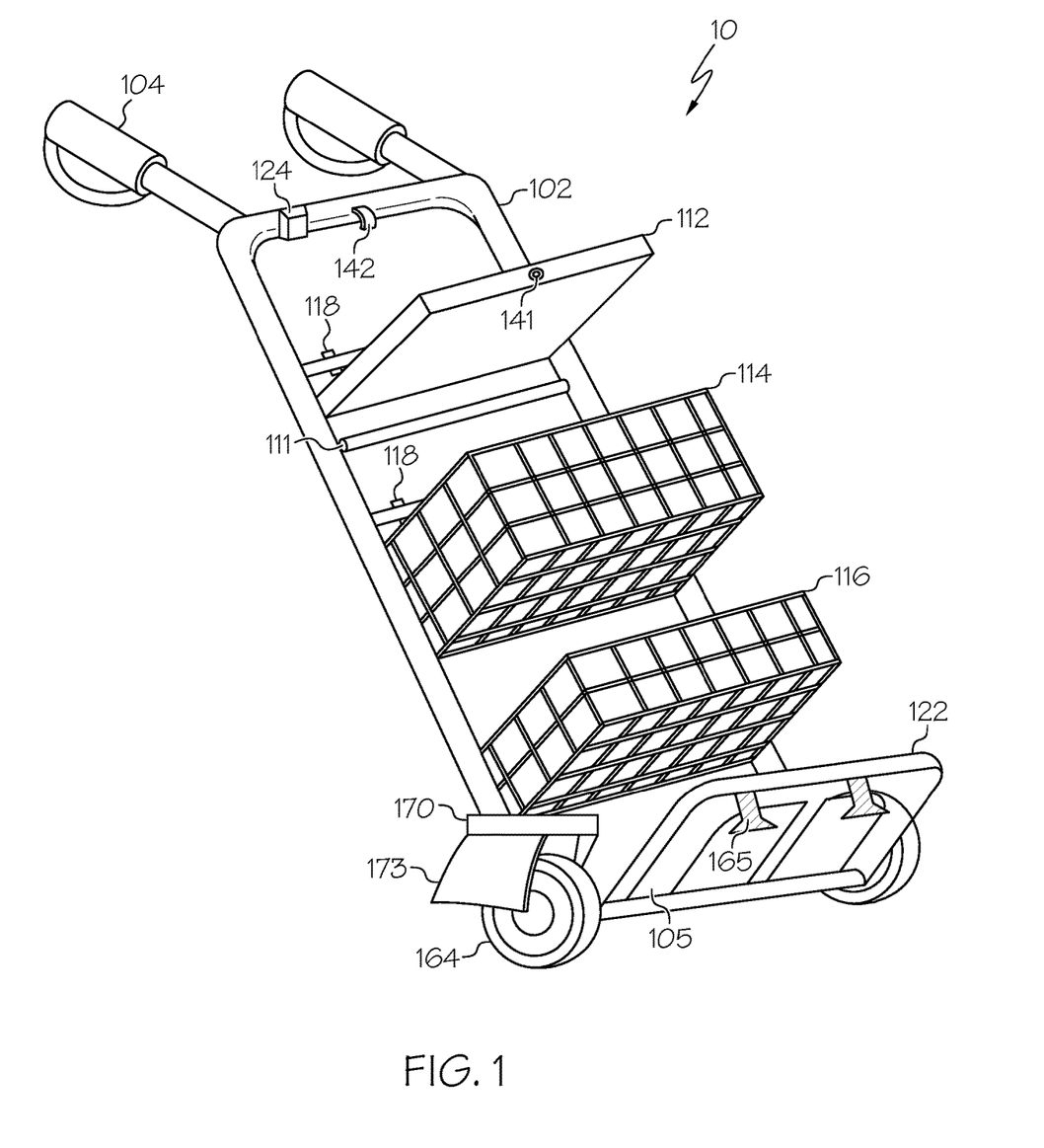
FIG. 1 is a perspective view of a special-purpose cart, in accordance with some embodiments.
Figure 2:
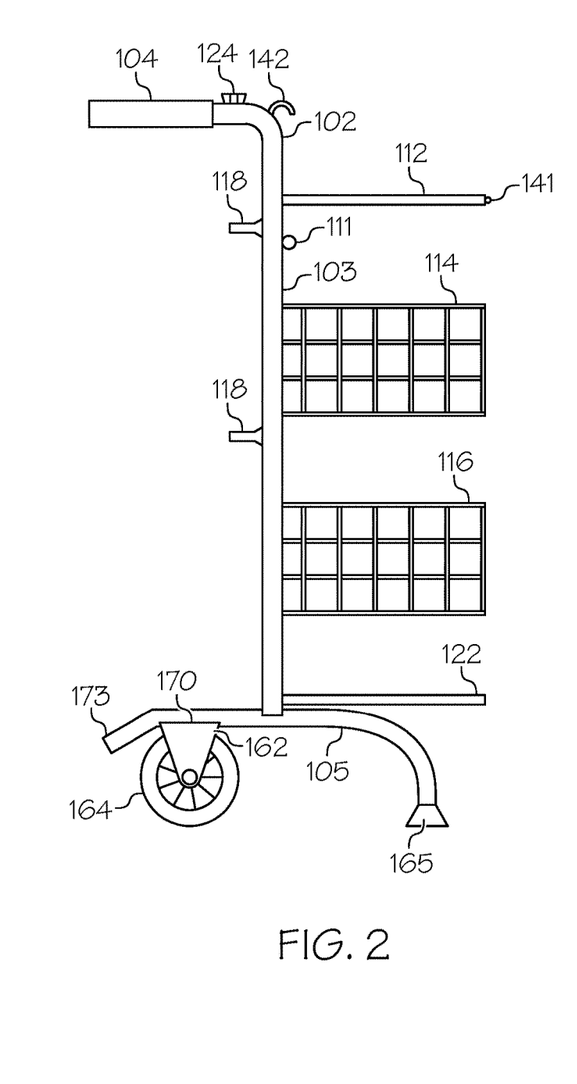
FIG. 2 is a side view of the special-purpose cart of FIG. 1
Figure 3:
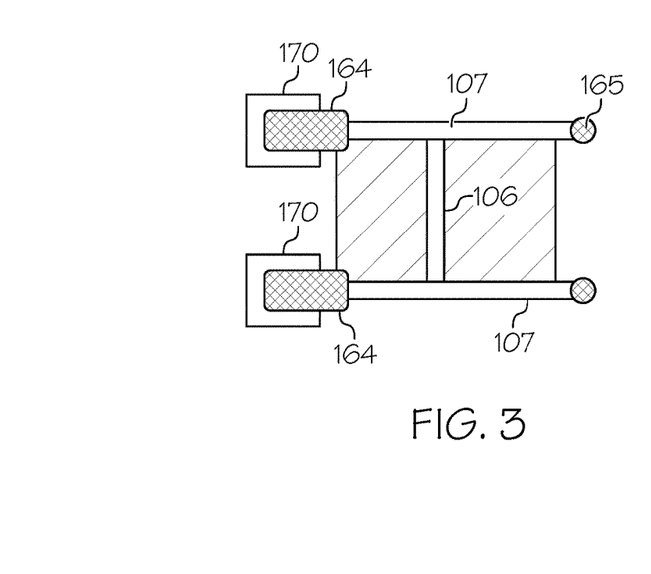
FIG. 3 is a bottom view of the special-purpose cart of FIGS. 1 and 2.
Figure 7:
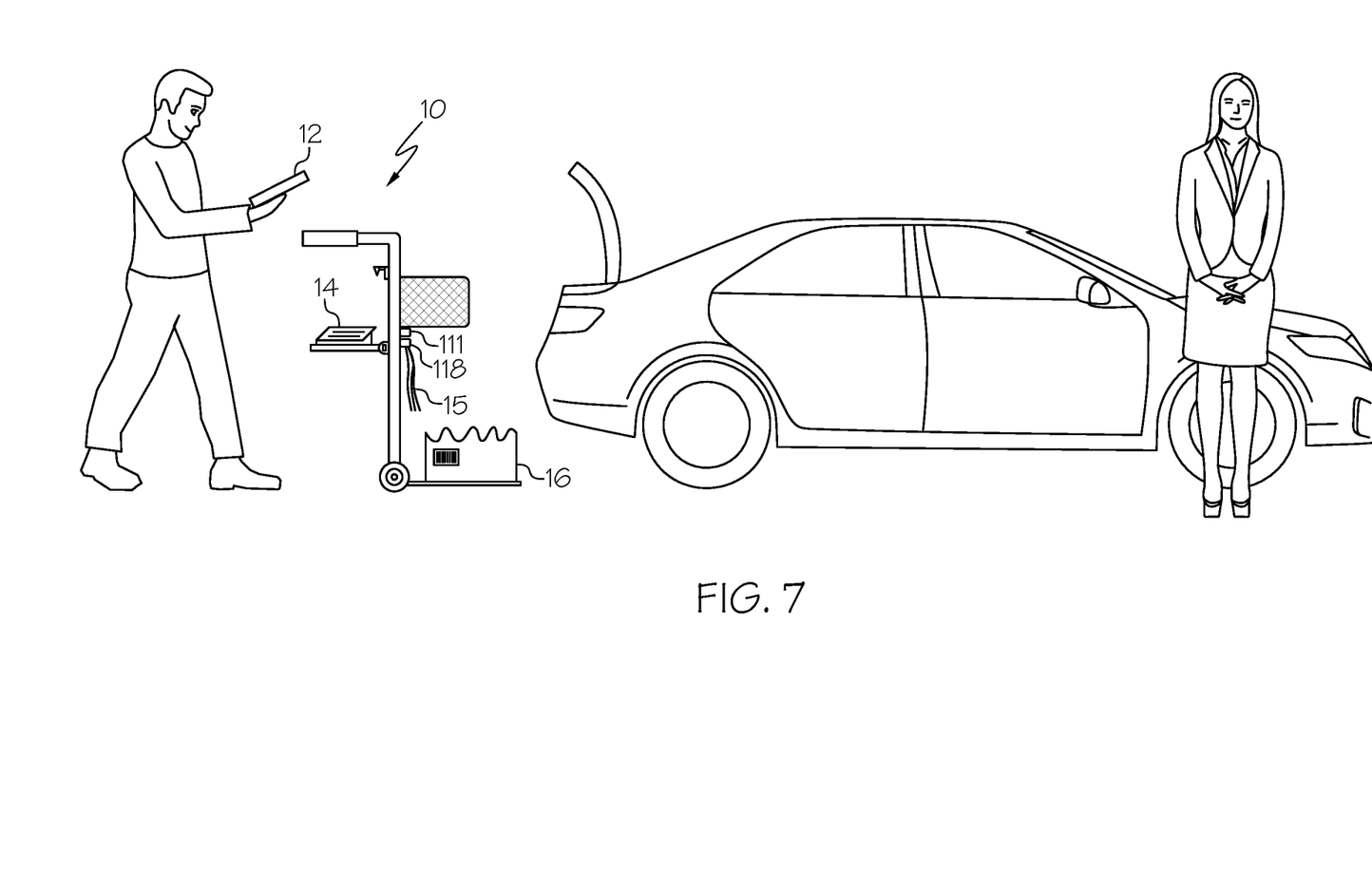
FIG. 7 is a view of a store associate assisting a customer in purchasing lawn and garden items using the special-purpose cart of FIGS. 1-3.

FIGS. 1-3 are various views of a special purpose cart 10, in accordance with some embodiments. In particular, the cart 10 is a special-purpose cart in that the cart 10 is constructed and arranged so that a person such as a store associate, e.g., an employee or contractor, can assist a customer in purchasing lawn and garden items at a retail establishment, while also allowing the store associate to perform a mobile point-of-sale (POS) operation using equipment co-located with lawn and garden accessories in or on the cart 10, otherwise part of the cart 10. For example, the cart 10 may be configured to function as part of a self-checkout model, where a consumer or store associate selects lawn and garden goods of interest, and uses a mobile electronic device such as a personal smartphone or store-provided scanning device to indicate the purchases while traveling through a retail establishment. Here, the cart 10 may be referred to as a lawn and garden mobile point-of-sale cart. In addition, the cart 10 can perform the function of transporting items of interest for purchase by the customer. Therefore, a store associate may rely on the cart 10 to assist the consumer with the checkout process. For example, as shown in FIG. 7, a store associate or store customer may use an electronic computing device 12 such as a scanner to scan the goods 16 for purchase near the consumer's vehicle in a parking lot near the store's lawn and garden center. Here, the store associate may perform additional services for the customer, such as printing receipts using a printer 14 transported in the cart 10, loading the purchased items 16 into the vehicle, operate a roll holder 111 that holds trunk liner bags, plastic sheets, or the like that can rotate relative to the holder 11, and be torn and separated or otherwise removed from the holder 111 for use in the customer's vehicle when loading lawn and garden items 16 from the cart 10 to the customer's vehicle. A store associate may use the cart 10 to assist with loading the items 16 into the customer's vehicle, but also transacting the purchase at or near the vehicle so that the consumer does not need to enter the store, then return to the vehicle for pickup.

In some embodiments, the cart 10 used by the store associate may include compartments or other regions for holding a key to a propane tank facility, an electronic device for performing retail operations, a printer for printing receipts and so on, a bagging fixture on which a number of shopping bag hangers, product sheets, and/or other items typically used by a store associate to assist shoppers. The cart 10 is constructed and arranged to hold any and all POS equipment required for operation by a store associate, and also carry items acquired by the customer, which would otherwise be carried by hand, placed in a pocket, or frequently used. Some of these items may be small, and prone to loss or misplacement if carried by hand, and so on.

To operate according to some embodiments, the cart 10 includes a frame 102, a folding tray 112, a first basket 114, a second basket 116, at least one bag holder 118, and at least one POS device.

The frame 102, also referred to as a support structure, is constructed and arranged to support the tray 112 and baskets 114, 116, which in turn carry items of interest or need by a user such as a store associate, for example, a combination of keys, electronic devices for point-of-sale processing, printers, bagging accessories, product sheets, scanning sheets, or other objects used by a store associate. Some or all of the frame 102 may be formed of tubular or other elongated elements, for example, metal and/or plastic elements. The support structure 102 includes a vertical portion 103 and a base portion 105 for supporting the tray 112 and baskets 114, 116. A wheel assembly 162 having a set of wheels 164 is coupled to the base 105, which allows the cart 10 to roll along the ground on the set of wheels 164. In some embodiments, the wheels 164 are similar to or the same as those used on a shopping cart. In some embodiments, the wheels 164 are removable for replacement with new wheels, or interchangeable with shopping cart wheels or related wheels. The wheels 164 may be removable by including a locking mechanism that attaches to an axle or other component of a wheel assembly, and that for removing the wheels 164 from the axle or other component of a wheel assembly. In some embodiments, the cart 10 may include shock absorbers, springs, and/or other suspension-related elements to dampen, absorb or otherwise reduce the shock impulses produced during motion of the cart 10.

Figure 4:
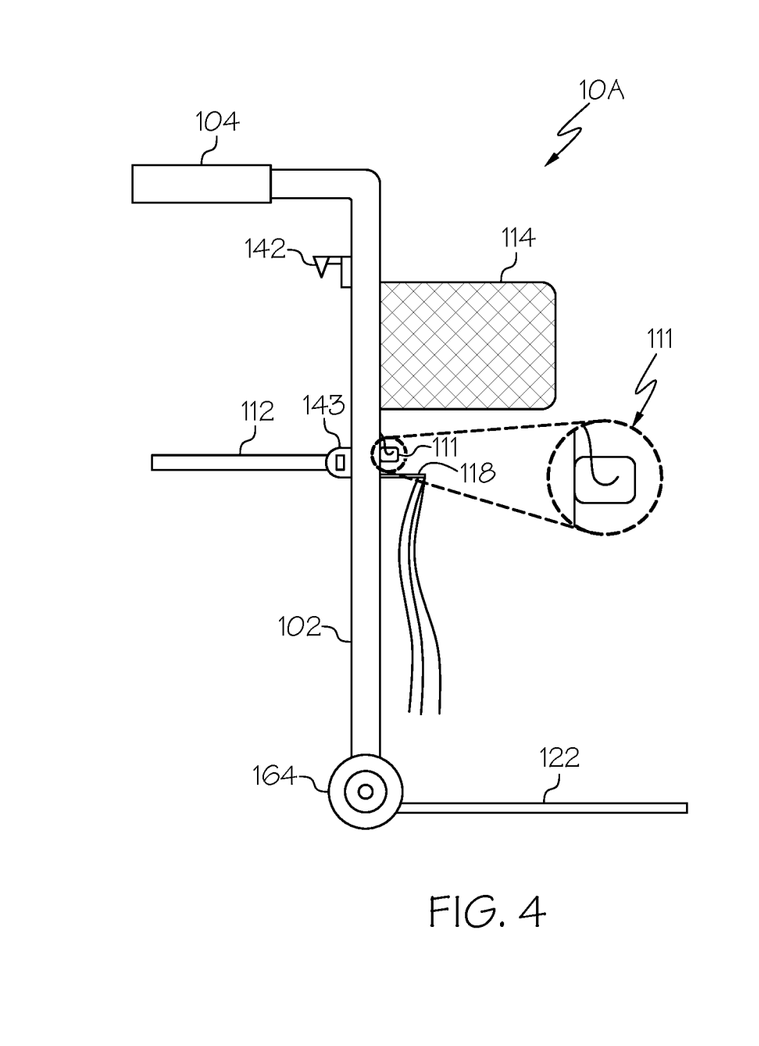
FIG. 4 is a side view of a special-purpose cart, in accordance with other embodiments.
Figure 5:
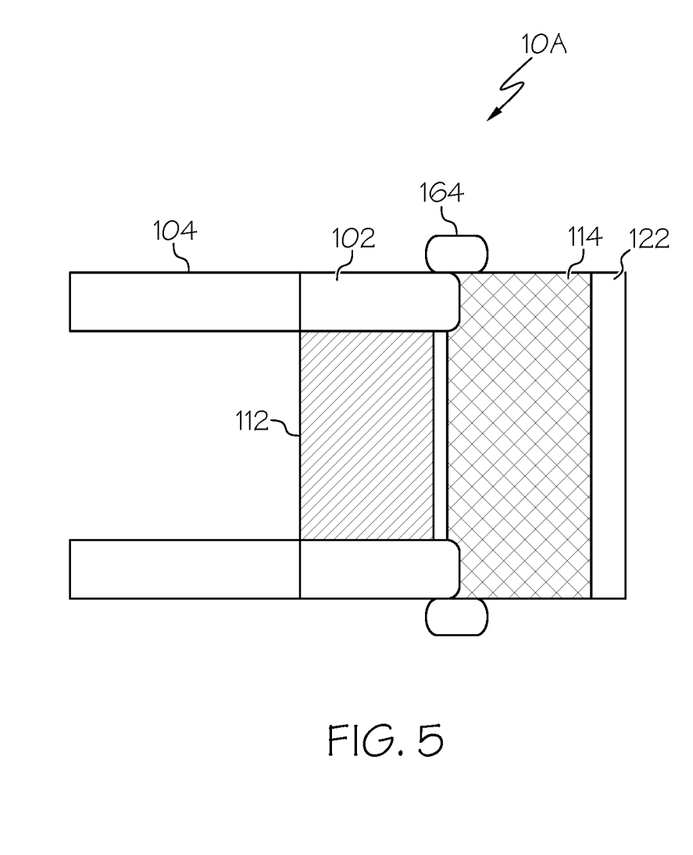
FIG. 5 is a top view of the special-purpose cart of FIG. 4.

In some embodiments, as shown in FIGS. 1-3, the wheels 164 may be at a center portion of the frame base 105, for permitting a distribution of weight of items placed on the cart 10. In other embodiments, as shown in FIGS. 4-5, the wheels 164 may be at a rear region of the frame 102, for example, along a same longitudinal axis as the vertical portion 103 of the frame 102. The location of the wheels 164 relative to the frame 102 may depend on specific needs and requirements of users of the cart 10, for example, to carry large bulky items, sensitive electronic components, and so on.

As shown in FIG. 3, the base 105 may include a cross-bar 106 that extends between two side members 107. The wheel assembly 162 in turn is attached to the side members 107. More specifically, the side members 107 are parallel so that one wheel 164 is coupled to each side member 107 and likewise parallel so as to allow a user to push or pull the cart 10 from a handle 104 extending from a top region of the support structure 102, for example, opposite the wheel assembly 162. In some embodiments, the cart 10 may include a fork or the like that extends from the side member 107, and the wheel 164 is positioned between the two prongs of the fork, and an axle extends between the prongs through the wheel 164 to allow rotation of the wheel 164. In some embodiments, the cart 10 includes only two wheels 164 at a rear region of the cart 10 as shown in FIGS. 1-3 and a front portion of each side member 107 includes a stop 165 as shown, so that one wheel 164 and one stop 165 are coupled to each side member 107. The stops 165 may be formed of rubber, plastic, or related material. Thus, a user may operate to move the cart 10 by applying a downward force on the handle 104 whereby the stops 165 are raised about the ground surface so that the rear wheels 164 freely rotate to move the cart 10.

In some embodiments, the base 105 includes a platform 122 on which lawn and garden items, or other items of interest to a customer, are positioned for transport when a store associate uses the rear wheels 164 as a pivot point thereby raising the stop(s) 165 off the ground allowing the rear wheels 164 to freely rotate.

In some embodiments, instead or in addition to a stop 165, the wheel assembly 162 may include a brake assembly 170 constructed and arranged to apply a force against the wheels 164 so as to stop or reduce any rotation of the wheels 164. The motion of the wheels 164 may be controlled by the brake assembly 170. In some embodiments, the brake assembly 170 includes a foot 173 or the like over at least one wheel 164 that directly contacts the wheel 164 to provide a sufficient force to reduce or prevent the free rotation of the wheel 164 about its axle. In some embodiments, the brake assembly 170 may include a shoe, pad, and so on that is activated by the user's foot providing a direct force, or by a cable extending from the shoe or the like to a lever, handle or the like controlled by the user's hand at or near the handle 104. In other embodiments, the brake assembly 170 may be activated by an actuator such as a strain gauge located on the frame 102 or base 105, which detects changes in the pressure applied along the post by an operator either lifting or pressing down on a hand lever or the like.

As described above, the handle 104 may be used to push the cart 10. The handle 104 may be configured to integrate with one or more buttons, switches, computer processes, or the like for operating the cart 10 from the handle 104. For example, the handle 104 may include a push button or switch, which in turn communicates with an actuator, motor, or the like for positioning the table 112 in an open or close position. In another example, the handle 104 may include a universal serial bus (USB) port or the like which in turn is coupled to a power and/or data cable extending through the frame 102 to a power generator, battery, WiFi device, and/or other electronic component that can communicate with a mobile electronic device plugged into the USB port.

Vertical portion 103 of the support structure 102 is constructed and arranged to support the folding tray 112, first basket 114, second basket 116, and bag holder 118 in a particular arrangement. For example, as shown, the folding tray 112, first basket 114, second basket 116 may extend horizontally from one side of the vertical portion 103, and the bag holder 118 may extend horizontally from an opposite side of the vertical portion 103. In some embodiments, the vertical portion 103 extends from a horizontal location of the base 105 that permits the weight of the elements of the cart 10 to be distributed in a manner that reduces or prevents unexpected, undesirable, or problematic toppling of the cart 10 during operation. In some embodiments, the baskets 114, 116 are removable, for example, first basket 114 and/or second basket 116 having a coupling element that removably secures to the frame 102.

In some embodiments, the vertical portion 103 of the support structure 102 includes telescopic legs so that the support structure can collapse, or reduce to a smaller length, for storage or reduced footprint when not in use. The vertical portion 103 may only have a top region that is telescopic so that the handle 104 and top portion collapse into the bottom portion of the vertical portion 103, but no more than a top surface of the folding tray 112 or top basket 114.

The folding tray 112 is constructed and arranged to extend from a top region of the frame 102 and to fold when retracted in an upright position, i.e., parallel to the vertical portion 103 of the frame 102 when not in use. The folding tray 112 and frame 102 may collectively include a locking mechanism such as a clasp, hook, and so on, for holding the folding tray 112 in the upright position, and further include a hinge that permits the folding tray 112 to pivot relative to the vertical portion 103 of the frame. In some embodiments, the folding tray 112 includes hydraulics, etc. to automatically (not manually) raise and lower the tray 112.

The folding tray 112 may be used by a store associate or other user for performing a POS operation, or any other operation that involves the assistance of customers, for example, used for folding cloth items, separating hardware accessories such as screws, nails, etc., and so on. When in use, the folding tray 112 when deployed extends horizontally from the vertical portion 103 of the frame. In doing so, the extended folding tray 112 is positioned over an opening of the first basket 114. In some embodiments, a sufficient space exists between the folding tray 112 and the first basket 114 to allow items to be placed into the first basket 114 even when the folding tray 112 is extended.

Figure 6A:
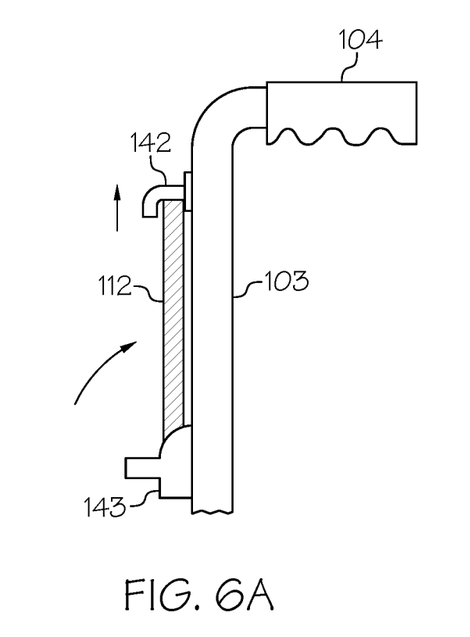
FIGS. 6A and 6B are side views of a special-purpose cart having a tray table in first and second positions, respectively, in accordance with some embodiments.

In some embodiments, the folding tray 112 has a single unitary planar portion, as shown in FIGS. 6A and 7B. In other embodiments, the tray 112 has two components coupled together but foldable relative to each other by a hinge or related element that permits the tray 112 to articulate relative to each other and/or the frame. Regardless of configuration, the tray table 12 is constructed and arranged to be stored in a vertical position relative to or against the vertical portion 103 of the frame 102. In some embodiments, the retractable tray table 12 has surface dimensions that vary between the retracted storage position and a deployed use position.

In some embodiments, the cart 10 includes a roll holder 111 for holding tear liner sheets for use in a customer's vehicle when loading lawn and garden items from the cart 10 to the customer's vehicle. The holder 111 provides a proper housing, which may be included as one of the compartments in the cart 10 for tear liners which can be used for vehicle trunks or floor spaces to protect the carpeting or interior of the vehicle from debris of the purchased items, such as a garden product.

In some embodiments, as shown in FIGS. 1 and 2, the tray 112 may include a coupler 141 that mates with or otherwise is held in place by a clip or related attachment mechanism 142 of a top bar or other region of the frame 102 to hold the tray 112 in a closed position. In other embodiments, the tray 112 may fold in a similar manner as described in FIGs.

The first basket 114 is preferably constructed and arranged for carrying handheld computing devices. The first basket may include a single interior region for carrying such items, or may include one or more storage compartments and/or sub-compartments in the interior so that the handheld computing devices can be arranged in the first basket 114, for example, organized according to size, amount of importance to the user, function, or other predetermined criteria. In particular, POS accessories such as barcode scanning devices, printers, computer network interface devices, and so on may be positioned in the first basket 114, but not limited thereto.

The second basket 116 may include other POS accessories, for example, printer paper and cartridges, batteries for the electronic devices, extra rolls of plastic, customer items for purchase, such as lawn and garden accessories, and/or other items used by a store associate to assist a store customer. At least one of the baskets 114, 116 can include compartments or regions of varying size, for example, a compartment that holds a set of keys or a compartment that holds fragile store items. In some embodiments, one or more additional baskets may be coupled to the frame, and coexist with the first basket 114 and second basket 116.

In some embodiments, the cart 10 includes an electric charge circuit that generates a voltage in response to a rotational movement of the wheels 164 of the cart, and that uses the generated voltage to charge mobile devices, such as a store or user-provided scanning device, smartphone, laptop, display screen, and so on. One or more rotating wheels 164 can provide mechanical energy in the form of rotational energy. Accordingly, a portion of a wheel's rotational energy into electrical energy that can be used to power other systems, components, and devices on the shopping cart 10.

Figure 8:
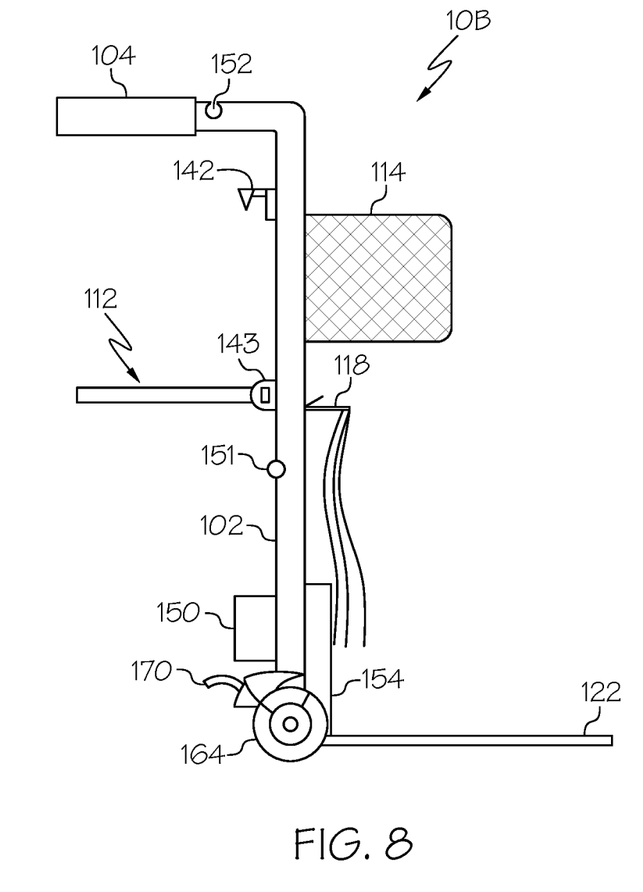
FIG. 8 is a diagram of a self-powered special-purpose cart, in accordance with some embodiments.

In some embodiments, as shown in FIG. 8, a cart 10B includes a power generator 150 that uses at least a portion of the rotational energy of at least one wheel 164 to produce energy, more specifically, a voltage, that can be processed by the power generator 150 to provide direct power to an electrical energy storage device such as a battery 154 or the like, for example, located at the handle 104, or coupled to the frame 102 as shown in FIG. 8. More specifically, the power generator 150 may be integrated into the wheel assembly, and may produce electricity through relative motion between one or more magnets and one or more coils comprising wire windings or lap winding core, thereby inducing electricity (e.g., voltage and/or AC and/or DC current) when magnets or related field poles rotate with respect to lap winding core, generating a current in lap winding core, which current generates an electric charge or voltage. The motion of one or more magnets disposed on the rotor induces electrical power in the windings disposed on the stator. Many generator variations are possible, as is well known in the electrical arts. In embodiments adapted for use in wheeled objects, one or more generators are disposed in or on the object and mechanically coupled to one or more wheels 164 so that electrical power is generated when the wheels turn. The power generator 150 may include other elements well-known but not shown such as rectifiers and the like.

In certain embodiments, the generator 150 is in electrical communication with an electrical energy storage device, which stores the electrical energy for use when the generator 150 is not producing electricity. The electrical storage device 154 can comprise one or more capacitors, rechargeable batteries, or other suitable devices for storing electrical energy.

The cart 10B may include a universal serial bus (USB) port or the like for charging an electrical connection to an electronic device or the like directly from the power generator or from a battery, capacitor, or other charge storage device. Referring again to FIG. 1, an electrical storage device such as computer memory, a phone connector, USB port, docking interface, and/or plug may be located at the handle 104, the frame 102, and/or other location of the cart 10. In some embodiments, the battery or the like and/or electronic devices plugged into charging ports or the like on the cart 10 may receive power from an external source such as an alternating current (AC) power supply, for example, a wall socket. The cart 10 may include an AC/DC converter so that electronic devices can be charged, for example, via a USB port 152 or the like. In some embodiments, the electrical storage device 154 may be charged by an output of the connector plug 151. Voltage regulators, rectifiers, converters, capacitors, switches, or related elements may be positioned between the power generator 150 and the electrical storage device 154 for regulating or otherwise providing a sufficient electric charge to the electrical storage device 154. This configuration provides a self-charging feature, which may be used by store associates, specifically, charging devices using the generator 150 and stored power on the battery pack 154.

In some embodiments, the cart 10 may include a speaker 124 and/or other electronic devices that output audio, for example, communications from another person desiring to communicate with the cart user. For example, the speaker 124 may receive and output a same message output to other loudspeakers in the store, for example, from another store representative requesting assistance. In another example, the cart 10 may include equipment that facilitates wireless communications, so that when the customer is ready for checkout, an application stored and executed at the customer or store associate mobile device can process a notification indicating that the customer is ready for a checkout operation, whereby the store associate may respond to the customer's request. The speaker 124 may be coupled to a computer processor, an input/output port of a computing device, or the like in order to receive and output audio, for example, to receive notifications from a remote computer such as the store server, a checkout counter, a store associate mobile device and so on that a particular customer is ready for checkout. The audio speaker 124 may include a wireless network interface for generating audio from the cart, and/or receiving audio signals from a remote location that are processed by a computer processor for audible output by the audio speaker 124. The cart 10 may include other processing computers to facilitate communication exchanges with the mobile device of a customer of interest, a store associate user, and so on.

FIGS. 4 and 5 are top and side views of a special purpose cart 10A, in accordance with other embodiments. The special purpose cart 10A of shown and described with respect to FIGS. 4 and 5 may be similar to the special purpose cart 10 shown and described with respect to FIGS. 1-3, except for a different arrangement and configuration of elements of the cart 10A.

In particular, the tray 112 is positioned on an opposite side of the frame 102 as the basket 114, for example, under the handles 104. At least one bag holder 118 is positioned under the basket 114. Also, the special purpose cart 10A includes a single basket 114 to allow more space between the bottom of the basket 114 and the base platform 122 for allowing larger volume items to be placed on the platform 122 for transport.

Figure 6B:
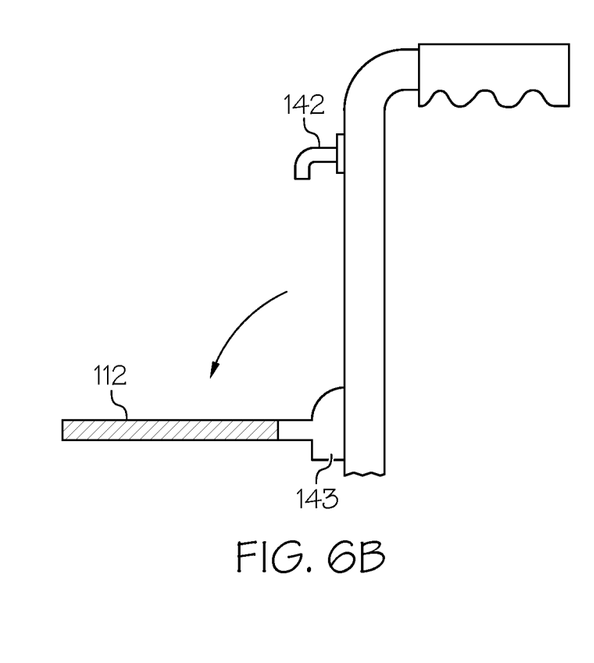

With further regard to the tray 112, as shown in FIGS. 6 and 7A, in order to lock the tray 112 in position, the tray 112 can translate along the vertical portion 103 of the frame 102, for example, via a combination of hinges 143 in communication with rods or other linear elements (not shown) that allow the tray 112 to move up and down the frame 102, while allowing the tray 112 tray to rotate via the hinge 143 regardless of the linear position of the tray 112. At or near the handle 104 may include a locking mechanism 142, that is constructed and arranged to lock the tray 112 in position when the tray is pulled up, then a force is applied to the tray 112 to move the tray 112 down and forward, i.e., into the frame 102, causing the locking mechanism to activate. The tray 112 may be unlocked by lifting the tray 112 up and out, i.e., away from the frame 102, in order to transition the tray 112 from a horizontal deployed position to a vertical stored or retracted position.

The embodiments and examples set forth herein were presented in order to best explain the present invention and its practical application and to thereby enable those of ordinary skill in the art to make and use the invention. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

What is claimed is:

1. A cart for use by a store associate in a lawn and garden center, comprising:
    a frame;
    a handle extending from the frame in a first direction at an angle relative to a direction of extension of the frame, the handle including at least one port that communicates with a mobile electronic device of the store associate for performing a point-of-sale operation from the cart;
    a folding tray table extending in an open state from a tubular top region of the frame and under the handle in the first direction, the tubular top region of the frame having an attachment mechanism that locks the tray table in a folded state;
    at least one basket extending from a portion of the frame along the direction of extension from the tubular top portion, the at least one basket further extending in a second direction opposite the first direction, wherein the at least one basket is configured for receiving lawn and garden items and items used by the store associate to assist customers, and the tray table is constructed and arranged to accommodate a point-of-sale device that communicates with the mobile electronic device of the store associate;
    at least one bagging fixture for holding shopping bags;
    a roll holder extending between the two tubular portions of the frame between the tray table and the at least one basket; and
    a wheel assembly coupled to a bottom region of the frame, comprising at least two wheels.

2. The cart of claim 1, further comprising a brake system for locking or unlocking the wheels of the wheel assembly.

3. The cart of claim 1, wherein the wheels have a same or similar configuration as shopping cart wheels, and removable for replacement with new shopping cart wheels.

4. The cart of claim 1, wherein the frame includes a vertical portion extending from the top region to the bottom region for supporting the tray table, the at least one basket, and the at least one bagging fixture, and further includes a base portion at the bottom region to which the wheel assembly is coupled.

5. The cart of claim 4, further comprising a trunk liner holder coupled to the vertical portion for holding a set of trunk liner bags.

6. The cart of claim 4, further comprising a platform coupled to the base for transporting lawn and garden items.

7. The cart of claim 4, further comprising at least one stop element on which a front portion of the base which separates the base from a ground surface, wherein the at least one stop element is separated from the ground surface when a force applied to the top region of the frame causes the cart to pivot about the wheels.

8. The cart of claim 1, wherein the at least one basket includes a first basket constructed and arranged for holding electronic devices for use by the store associate in a mobile point-of-sale operation, and a second basket constructed and arranged for holding a plurality of accessories for use by the store associate in assisting a store customer at the lawn and garden center.

9. The cart of claim 1, wherein the folding tray table is folded into an up position when not in use, and extends to a down position when in use.

10. The cart of claim 1, wherein the cart includes a power system including a battery, a generator that receives and processes power produced by a rotation of the wheels, at an electrical outlet for charging electronic items.

11. The cart of claim 1, further comprising an audio speaker and a wireless network interface for generating and outputting audio from the cart.

12. A cart for use by a store associate in a lawn and garden center, comprising:
    a frame comprising a vertical portion and a base at a distal end of the vertical portion;
    a handle extending from a proximal end of the vertical portion, the base extending in a first direction and the handle extending in a second direction that is opposite or nearly opposite than the first direction of the base, the handle including at least one port that communicates with a mobile electronic device of the store associate for performing a point-of-sale operation from the cart;
    a folding tray table extending in the first direction from the frame under the handle, the proximal end of the frame having an attachment mechanism that locks the tray table in a folded state, and the tray table is constructed and arranged to accommodate a first point-of-sale device that communicates with the mobile electronic device of the store associate;
    a basket extending from the vertical portion of the frame over the base in the first direction wherein a combination of the tray table and the basket are constructed and arranged to receive and temporarily store lawn and garden items and items used by the store associate to assist customers;
    a wheel assembly coupled to the base;
    a platform on which lawn and garden items are positioned for transport when a force is applied to the handle so that the wheel assembly includes a pivot point thereby raising the base off the ground so that wheels of the wheel assembly freely rotate;

a roll holder extending between two tubular portions of the vertical portion of the frame between the tray table and the basket; and at least one second point-of-sale device coupled to the cart for providing a mobile point of sale operation from a location co-located with a delivery of the lawn and garden items.

13. The cart of claim 12, further comprising a brake system for locking or unlocking the wheels of the wheel assembly.

14. The cart of claim 12, wherein the wheels have a same or similar configuration as shopping cart wheels, and removable for replacement with new shopping cart wheels.

15. The cart of claim 12, further comprising a trunk liner holder coupled to the vertical portion for holding a set of trunk liner bags.

16. The cart of claim 12, further comprising at least one stop element on which a front portion of the base which separates the base from a ground surface, wherein the at least one stop element is separated from the ground surface when a force applied to the top region of the frame causes the cart to pivot about the wheels.

17. The cart of claim 12, wherein the folding tray table is folded into an up position when not in use, and extends to a down position when in use.

18. The cart of claim 12, wherein the cart includes a power system including a battery, a generator that receives and processes power produced by a rotation of the wheels, at an electrical outlet for charging electronic items.

19. The cart of claim 12, further comprising an audio speaker and a wireless network interface for generating and outputting audio from the cart.

* * * * *